United States Patent
MacCallum

(10) Patent No.: US 11,097,843 B1
(45) Date of Patent: Aug. 24, 2021

(54) AEROSPACE BALLOON SYSTEM, PARACHUTE, AND METHOD OF OPERATION

(71) Applicant: Space Perspective Inc., Kennedy Space Center, FL (US)

(72) Inventor: Taber MacCallum, Kennedy Space Center, FL (US)

(73) Assignee: Space Perspective Inc., Kennedy Space Center, FL (US)

( * ) Notice: Subject to any disclaimer, the term of this patent is extended or adjusted under 35 U.S.C. 154(b) by 0 days.

(21) Appl. No.: 17/165,814

(22) Filed: Feb. 2, 2021

Related U.S. Application Data

(60) Provisional application No. 62/969,447, filed on Feb. 3, 2020.

(51) Int. Cl.
  *B64B 1/40* (2006.01)
  *B64D 1/12* (2006.01)
  *B64D 17/18* (2006.01)

(52) U.S. Cl.
  CPC ............... *B64D 1/12* (2013.01); *B64B 1/40* (2013.01); *B64D 17/18* (2013.01)

(58) Field of Classification Search
  CPC .............. B64B 1/40; B64D 1/12; B64D 17/18
  See application file for complete search history.

(56) References Cited

U.S. PATENT DOCUMENTS

| | | | |
|---|---|---|---|
| 2,756,948 A | | 7/1956 | Winzen et al. |
| 9,540,091 B1 | * | 1/2017 | MacCallum ............... B64B 1/44 |
| 9,694,910 B2 | * | 7/2017 | MacCallum ............ B64D 17/00 |
| 2006/0000945 A1 | * | 1/2006 | Voss ......................... B64B 1/60 244/97 |
| 2016/0264248 A1 | * | 9/2016 | MacCallum ............ B64D 17/62 |
| 2017/0129579 A1 | * | 5/2017 | de Jong ..................... B64B 1/70 |
| 2017/0297724 A1 | * | 10/2017 | Leidich ................ B64D 17/025 |
| 2017/0331177 A1 | * | 11/2017 | MacCallum ............... B64B 1/40 |
| 2018/0105250 A1 | | 4/2018 | Scott |
| 2020/0172253 A1 | | 6/2020 | Yakimenko |

FOREIGN PATENT DOCUMENTS

FR  3052437 A1  12/2017

* cited by examiner

*Primary Examiner* — Philip J Bonzell
*Assistant Examiner* — Tye William Abell
(74) *Attorney, Agent, or Firm* — Jeffrey Schox; Samuel Rosenthal

(57) ABSTRACT

A balloon system including a balloon, a payload, and a safety module. A safety module, preferably including a tether and a parachute, and optionally including a cover and/or a drogue. A method of balloon system operation, preferably including operating the balloon system in flight and descending under a parachute.

21 Claims, 12 Drawing Sheets

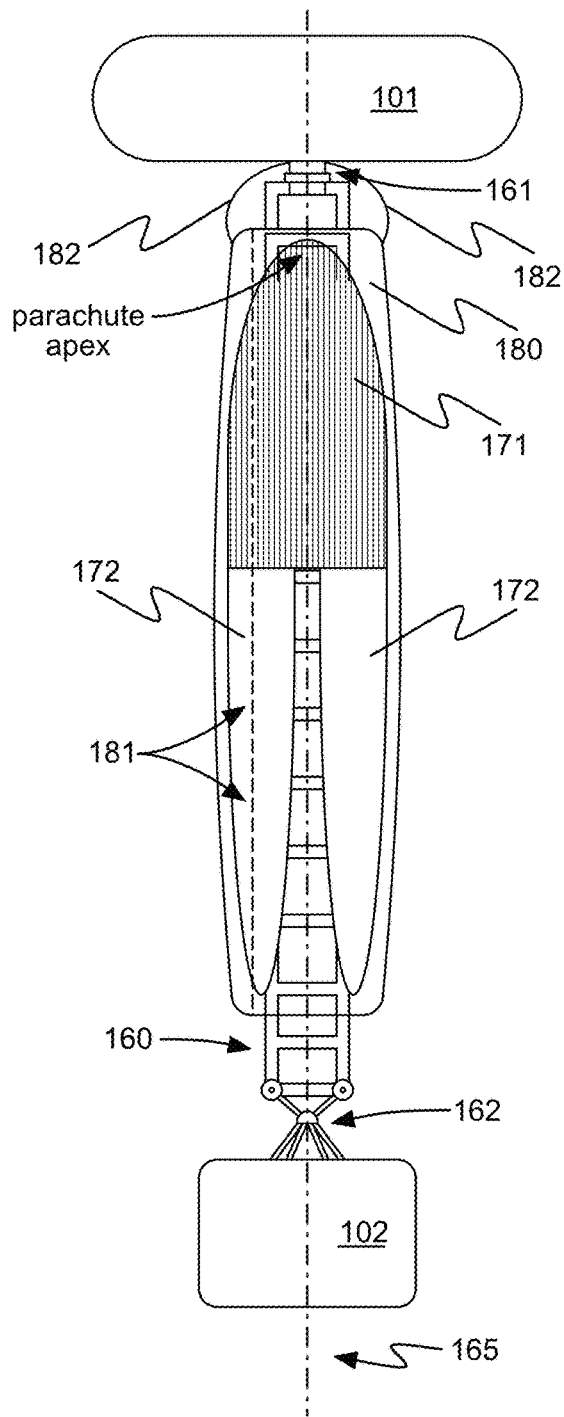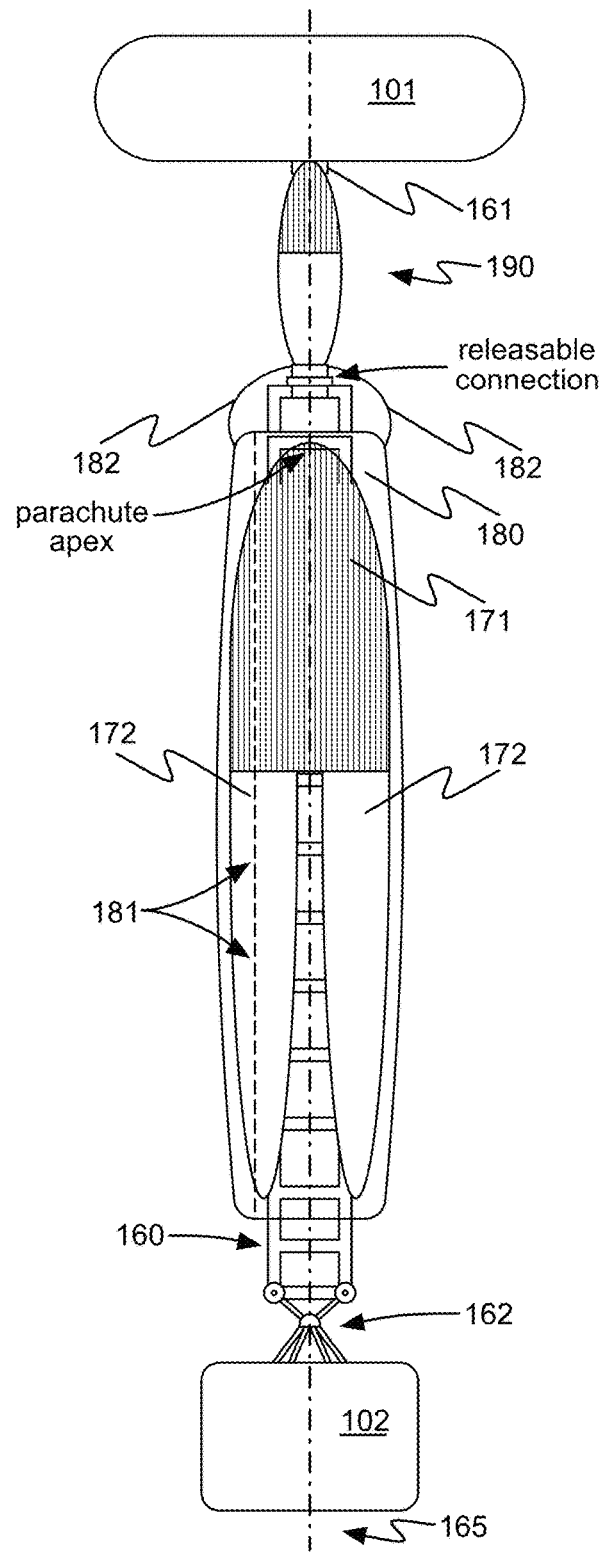
FIGURE 3A
FIGURE 3B

AEROSPACE BALLOON SYSTEM, PARACHUTE, AND METHOD OF OPERATION

CROSS-REFERENCE TO RELATED APPLICATIONS

This application claims the benefit of U.S. Provisional Application Ser. No. 62/969,447, filed on Feb. 3, 2020, which is incorporated in its entirety by this reference.

TECHNICAL FIELD

This invention relates generally to the aerospace vehicle field, and more specifically to a new and useful aerospace balloon system, parachute, and method of operation.

BACKGROUND

Typical balloon systems may include parachutes that are held taut between a balloon and a payload, thus preventing parachute deployment while the balloon is connected to the payload. Additionally or alternatively, in typical balloon systems, the connection between the balloon and payload may interfere with proper parachute canopy opening (e.g., wherein this connection is held taut in the region above the payload into which the canopy should open for proper parachute deployment). Thus, there is a need in the aerospace vehicle field to create a new and useful aerospace balloon system, parachute, and method of operation.

BRIEF DESCRIPTION OF THE FIGURES

FIGS. 3A-3B are side views of a first and second example, respectively, of the safety module in the stowed configuration.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 7A:
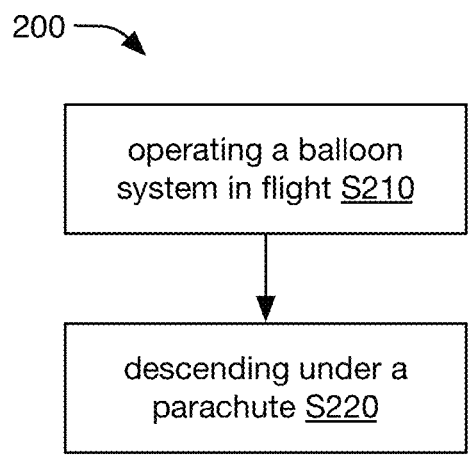
FIGS. 7A-7B are schematic representations of an embodiment of a method and an example of the embodiment, respectively.
Figure 7B:
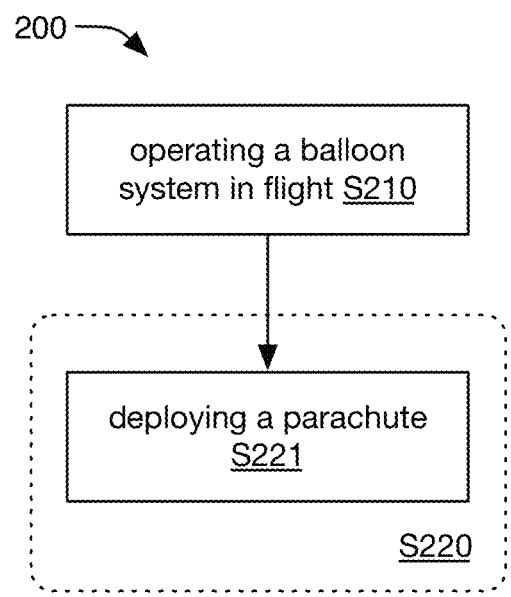

A balloon system 100 preferably includes a balloon 101, a payload 102, and/or a safety module 103 (e.g., as shown in FIGS. 1A-1D). The safety module 103 preferably includes a tether 160 and a parachute 170, and can optionally include a cover 180, a drogue 190, and/or any other suitable elements (e.g., as shown in FIG. 2). However, the balloon system 100 can additionally or alternatively include any other suitable elements in any suitable arrangement. A method 200 of balloon system operation preferably includes operating the balloon system in flight S210 and descending under a parachute S220 (e.g., as shown in FIGS. 7A-7B). However, the method 200 can additionally or alternatively include any other suitable elements performed in any suitable manner.

2. Benefits.

Embodiments of the balloon system 100 and/or method 200 can confer one or more benefits. First, some embodiments can enable simultaneous use of a balloon and parachute, both supporting a payload (e.g., wherein both the balloon and parachute are used to slow descent of the system). Second, in some embodiments, the ability to use such a parachute in the absence of the balloon (e.g., after balloon release and/or failure), preferably to slow system descent, can be preserved. However, the system and/or method can additionally or alternatively confer any other suitable benefits.

3. Balloon System.

The balloon system 100 is preferably a balloon-based aerospace vehicle (e.g., balloon-propelled space capsule), such as a balloon-propelled vehicle configured to operate in the troposphere, stratosphere, and/or any other suitable atmospheric layers. However, the system can additionally or alternatively be any other suitable lighter-than-air vehicle or aerostat (e.g., airship), or any other suitable aerospace vehicle. In alternate embodiments, the system can additionally or alternatively function as a terrestrial vehicle, a watercraft, and/or any other suitable vehicle.

The system 100 can optionally include one or more elements such as described in U.S. Provisional Patent Application 62/969,447, filed Feb. 3, 2020 and titled "Space Capsule", which is herein incorporated in its entirety by this reference. In examples, the balloon 101 can include one or more elements described in U.S. Provisional Patent Application 62/969,447 regarding the 'Balloon System', the payload 102 can include one or more elements described in U.S. Provisional Patent Application 62/969,447 regarding the 'Capsule System' and/or 'Avionics and Power', and/or the safety module 103 can include one or more elements described in U.S. Provisional Patent Application 62/969,447 regarding the 'Backup Descent System'. However, the system 100 can additionally or alternatively include any other suitable elements described in U.S. Provisional Patent Application 62/969,447.

3.1 Balloon.

The balloon 101 preferably defines an apex and a nadir. When the balloon is inflated and in flight, the apex is arranged at (or substantially at) the top of the balloon (e.g., with respect to a gravity vector), and the nadir is arranged at (or substantially at) the bottom of the balloon (e.g., opposing the apex across the balloon along or substantially along the gravity vector).

The balloon preferably functions to contain a lighter-than-air fluid (e.g., lift gas, such as helium, molecular hydrogen, etc., and/or mixtures thereof). The balloon can be a zero-pressure balloon (e.g., configured to maintain a substantially zero-pressure configuration, in which the balloon interior is at substantially the same pressure as the atmosphere surrounding the balloon, while fully and/or substantially-fully inflated; configured not to maintain a substantially greater pressure within the balloon than in the surrounding atmosphere; etc.), a super-pressure balloon, and/or any other suitable balloon. However, the balloon can alternatively be a super-pressure balloon or any other suitable type of balloon.

In some embodiments, the balloon 101 (and/or elements thereof, such as the envelope no) can include one or more elements such as described in U.S. patent application Ser. No. 17/162,151, filed 29 Jan. 2021 and titled "Aerospace Balloon System and Method of Operation" and/or in U.S. patent application Ser. No. 17/164,668, filed Feb. 1, 2021 and titled "Aerospace Balloon System and Method of Operation", each of which is incorporated in its entirety by this reference (e.g., as described regarding the 'balloon 101' and/or the 'envelope 110'). For example, the balloon 101 can optionally include an apex fitting and/or nadir fitting such as described in U.S. patent application Ser. No. 17/162,151, and/or the envelope 110 can include one or more gores, load members, and/or reinforcement elements such as described in U.S. patent application Ser. No. 17/162,151. Additionally or alternatively, the balloon 101 can optionally include one or more passive vents such as described in U.S. patent application Ser. No. 17/164,668.

However, the balloon 101 can additionally or alternatively include any other suitable elements in any suitable arrangement.

3.2 Payload.

The balloon system can optionally include one or more payloads 102. In flight, the payload is preferably supported by (e.g., suspended from) the balloon 101 and/or parachute 170, but can additionally or alternatively be configured in any other suitable manner.

The payload 102 preferably includes a capsule (e.g., for containing human passengers), but can additionally or alternatively include any other suitable elements. In examples, the payload 102 can include one or more elements such as described in U.S. patent application Ser. No. 17/160,837, filed Jan. 28, 2021 and titled "Aerospace Vehicle System and Method of Operation", which is herein incorporated in its entirety by this reference (e.g., as described in U.S. patent application Ser. No. 17/160,837 regarding the 'capsule 11').

3.3 Safety Module.

As described above, the safety module 103 preferably includes a tether 160 and a parachute 170. The safety module can optionally include a cover 180, a drogue 190, and/or any other suitable elements. The safety module preferably functions to facilitate (e.g., ensure) safe flight operation of the balloon system. For example, the safety module can enable recovery from failures of elements of the system, such as the balloon.

3.3.1 Tether.

The tether 160 preferably functions to mechanically connect (e.g., tether) the payload to the balloon. During balloon system flight, the tether preferably suspends the payload from the balloon. The tether can define a long axis 165 along its length (e.g., between a balloon end 161 and a payload end 162 of the tether), such as shown by way of examples in FIGS. 3A-3B.

The balloon end 161 of the tether is preferably mechanically connected to the balloon. The mechanical connection at the balloon end is preferably operable to disconnect. For example, this connection can be a releasable connection (e.g., can be operable to transition from a connected configuration to a release configuration in which the mechanical connection between the tether and balloon is disconnected). The tether is preferably connected to the balloon proximal to the balloon nadir, but can additionally or alternatively be connected in any other suitable location.

The payload end 162 of the tether is preferably mechanically connected to the payload. This connection can optionally be operable to disconnect (e.g., analogous to the balloon end connection), which can function to allow release of the tether from the payload, such as after balloon system landing.

The tether can be flexible (e.g., wherein the tether is configured to connect the payload to the balloon in tension), rigid, and/or have any other suitable mechanical characteristics. The tether preferably exhibits torsional resistance to twisting about its long axis. This torsional resistance can function to prevent excessive twisting of the parachute 170 (e.g., limiting twisting such that it does not impede deployment and/or operation of the parachute). In a first embodiment, the tether defines a ladder structure (e.g., rope and/or cable ladder, rigid ladder such as a metal and/or composite ladder, etc.), such as shown by way of example in FIGS. 3A-3B. The ladder structure (e.g., the rungs thereof) can function to provide the desired torsional resistance. In a second embodiment, the tether includes one or more rigid members (e.g., poles) extending along its length. These rigid members can include metal, composites (e.g., carbon fiber composite), and/or any other suitable materials.

Additionally or alternatively (e.g., in embodiments in which the tether does not exhibit substantial torsional resistance, such as in which the tether includes a single rope or cable), the tether can include one or more rotary couplings 163, such as at or near the ends of the tether (and/or at any other suitable locations along the tether, preferably locations above and/or below connection points of the parachute to the tether). For example, the mechanical connection to the balloon and/or to the payload can include a rotary coupling 163. The rotary couplings 163 are preferably operable to rotate about (or substantially about) the tether long axis, but can additionally or alternatively define any other suitable rotational axes. These rotary couplings can function to prevent twisting of the tether and/or portions thereof (and thus preventing twisting of the parachute).

However, the tether can additionally or alternatively include any other suitable elements in any suitable arrangement.

3.3.2 Parachute.

The parachute 170 preferably functions to slow descent of the balloon system (e.g., in tandem with the buoyancy of the balloon, without the balloon such as in case of balloon failure, etc.). The parachute preferably includes a canopy 171 and a set of suspension lines 172, and can optionally include one or more deployment mechanisms 173 (e.g., as shown in FIGS. 3A-3B, 4A-4C, 5A-5B, and/or 6A-6B). In examples, the parachute can be a round parachute, cruciform parachute, pull-down apex parachute, annular (e.g., toroidal) parachute, ram-air parachute, a parasail, or can have any other suitable shape and/or structure.

Figure 5A:
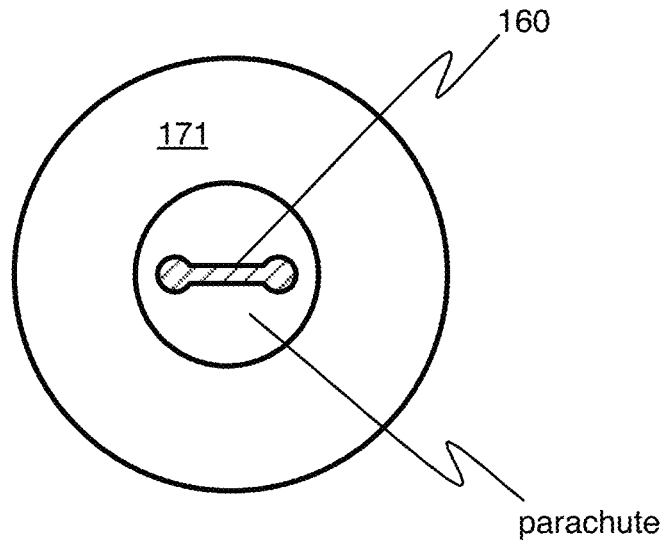
FIGS. 5A-5B are cross-sectional plan views of a first example of the safety module in the stowed configuration and the deployed configuration, respectively.
Figure 5B:
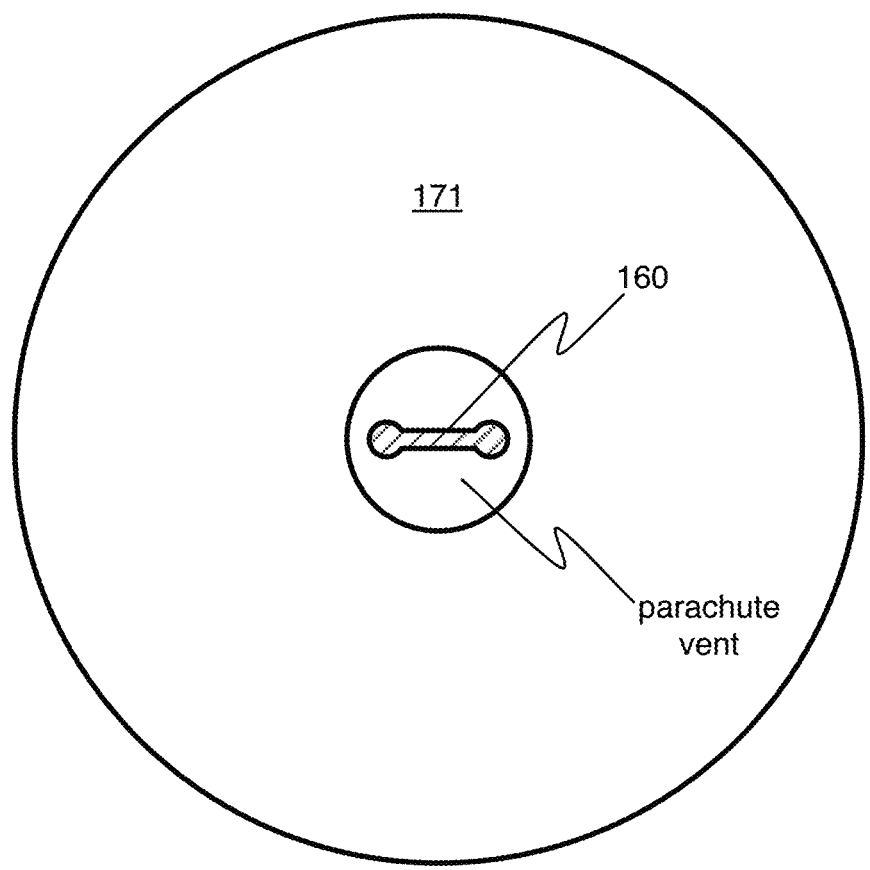
Figure 5C:
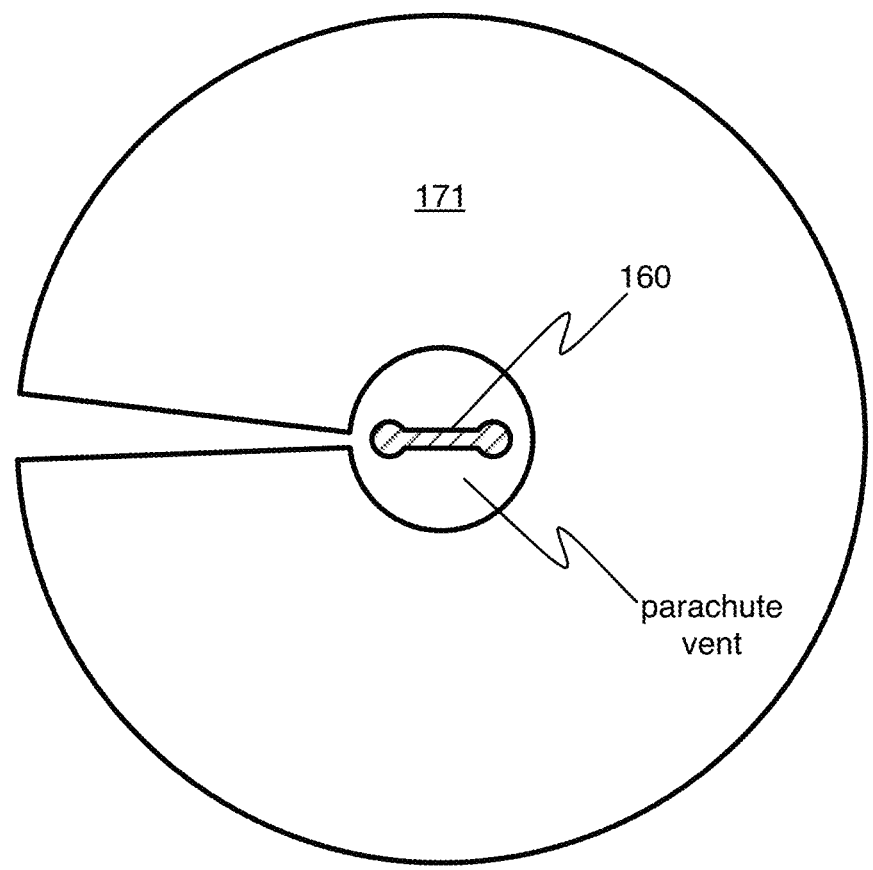
FIG. 5C is a cross-sectional plan view of a second example of the safety module in the deployed configuration.

The canopy 171 preferably encircles the tether (e.g., as shown in FIGS. 5A-5C and/or 6A-6B). For example, the tether can extend through (e.g., and be captive within) a vent defined in the canopy (e.g., central vent, apex vent, etc.). In this arrangement, the tether preferably does not obstruct the canopy when it is open. In some embodiments, the canopy encircles the tether both when stowed and when deployed (e.g., as shown in FIGS. 5A-5B); in such embodiments, if the system includes a cover, it preferably also encircles the tether. In other embodiments, the canopy encircles the tether when deployed (e.g., as shown in FIG. 5C) but not when stowed (e.g., is arranged alongside the tether when stowed); in such embodiments, if the system includes a cover, it may also encircle the tether (e.g., covering both the parachute and the tether alongside it), it may not encircle the tether (e.g., covering the parachute and arranged next to the tether), or it may have any other suitable arrangement. Thus, this arrangement can enable parachute deployment in a variety of circumstances, such as with or without the balloon attached to the payload.

The set of suspension lines 172 preferably functions to suspend the payload from the canopy, and to control and/or maintain the canopy shape (when the parachute is deployed). The lines preferably connect between the canopy (e.g., canopy skirt) and the payload. In some examples, they may connect to the payload via the tether, such as via a lower portion of the tether (e.g., below the point at which the canopy encircles the tether).

The parachute can preferably be configured in a stowed configuration and a deployed configuration, more preferably wherein the parachute is operable to transition from the stowed configuration to the deployed configuration.

In the stowed configuration, the canopy is preferably not open, such as shown by way of examples in FIGS. 3A-3B. For example, the canopy can be collapsed and/or folded, preferably along and/or around the tether. In this configuration, the suspension lines and/or canopy are preferably not under significant load. Preferably, the suspension lines and/or canopy are slack (rather than taut), but the suspension lines and/or canopy can alternatively be held taut by a minimal load (e.g., a load that can be overcome during parachute deployment; a load that can be released during parachute deployment, such as without releasing the balloon from the payload; etc.), rather than by a substantial portion of a load arising from supporting the payload. This can enable the transition of the parachute to the deployed configuration without the need to release tether tension (e.g., by releasing the balloon). In contrast, if the tether tension were carried (e.g., entirely carried, carried in substantial part, etc.) by the parachute, this tension could hold the parachute closed, preventing it from deploying. The distance between the canopy and the bottom of the suspension lines of a stowed parachute held in tension between these points is typically greater than the height of the parachute once deployed (as the canopy and suspension lines will extend outward in deployment), and so the process of deploying the parachute while held in such tension would typically require overcoming the tension load in order to achieve this reduction in length.

In the stowed configuration, the suspension lines preferably extend substantially along the tether (e.g., down from the canopy to their attachment at the payload and/or lower portion of the tether), such as shown by way of example in FIGS. 3A-3B. In some embodiments, the parachute includes one or more temporary fasteners, which can function to hold elements of the parachute in place while stowed, such as by holding these elements to the tether 160, the cover 180, other elements of the parachute, and/or any other suitable elements of the balloon system. These temporary fasteners are preferably configured to release (e.g., break) when the parachute transitions to the deployed configuration. In examples, these temporary fasteners can include break lines, rubber bands, and the like, but can additionally or alternatively include any other suitable elements in any suitable arrangement.

Figure 1A:
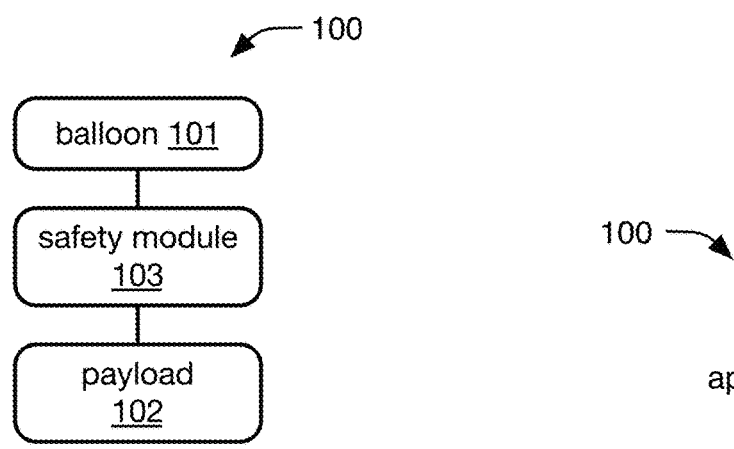
FIG. 1A is a schematic representation of an embodiment of a balloon system.
Figure 1B:
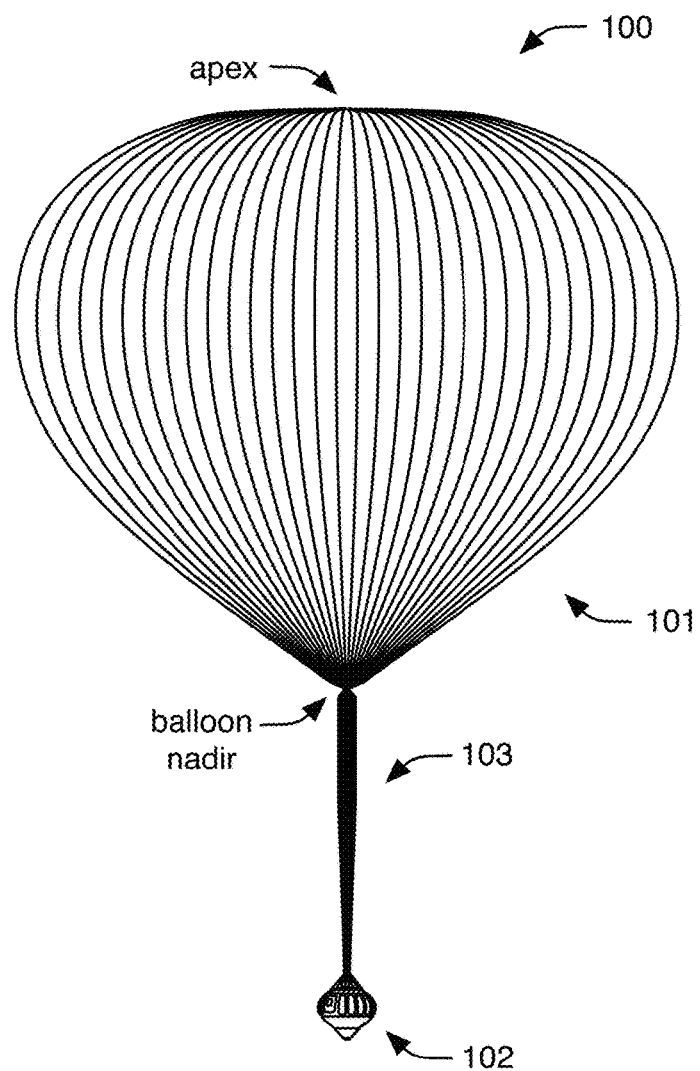
FIGS. 1B-1D are side views of an example of the balloon system in a fully-inflated state, a partially-inflated state, and a balloon-detached state, respectively, with the parachute in a stowed configuration.
Figure 1C:
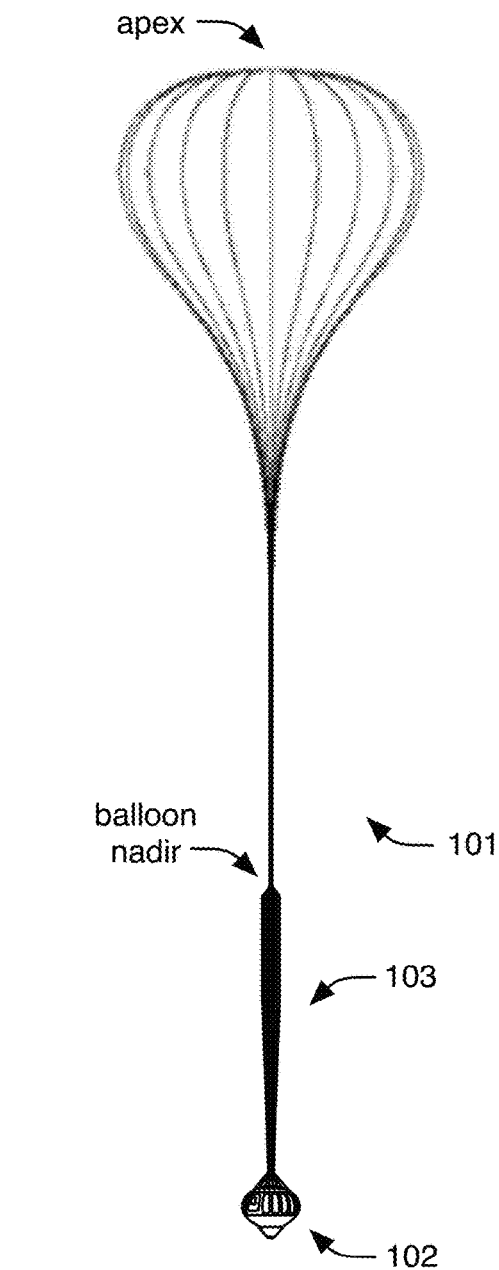
Figures 1D, 2:
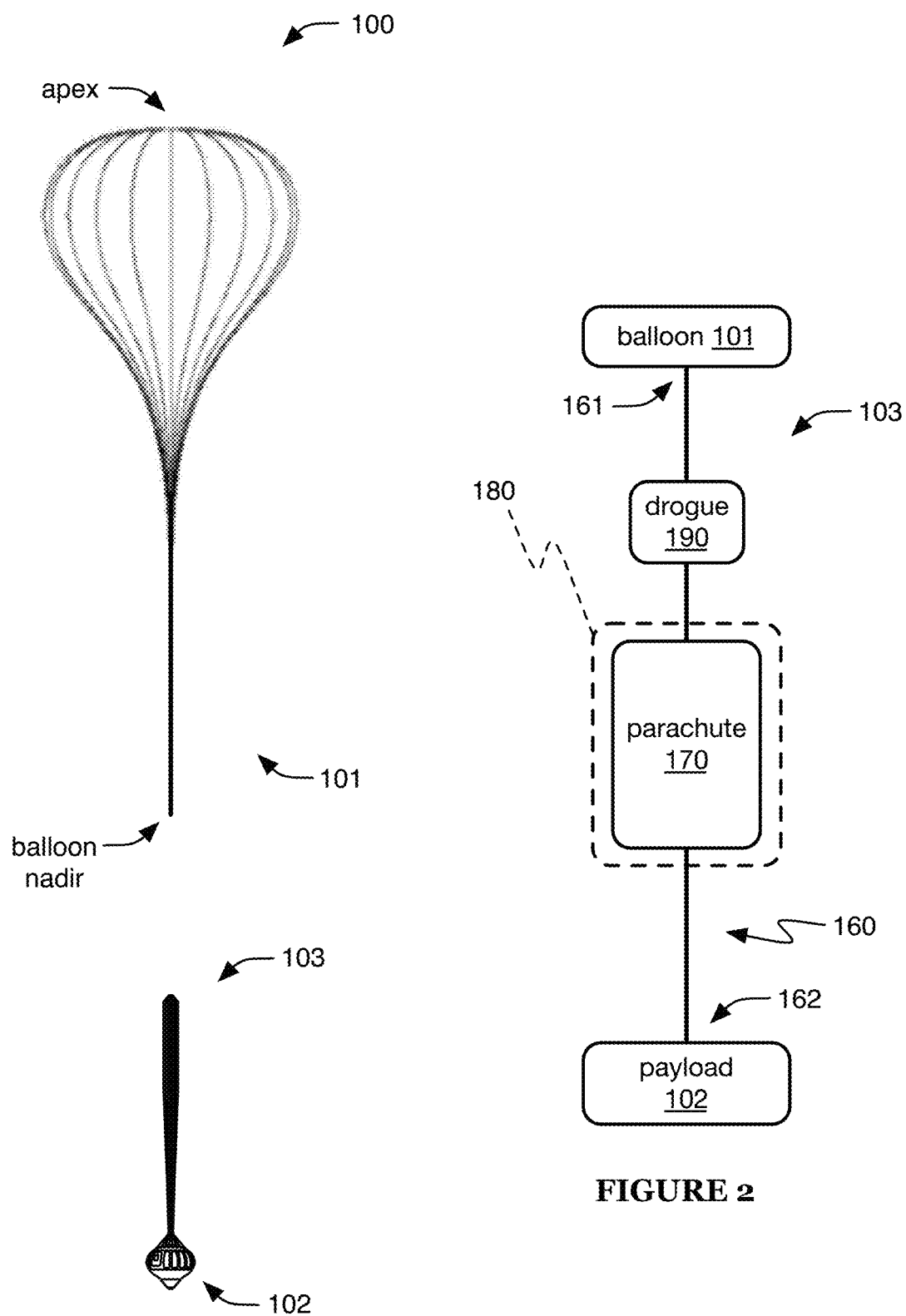
FIG. 2 is a schematic representation of an embodiment of a safety module of the balloon system.
Figure 4A:
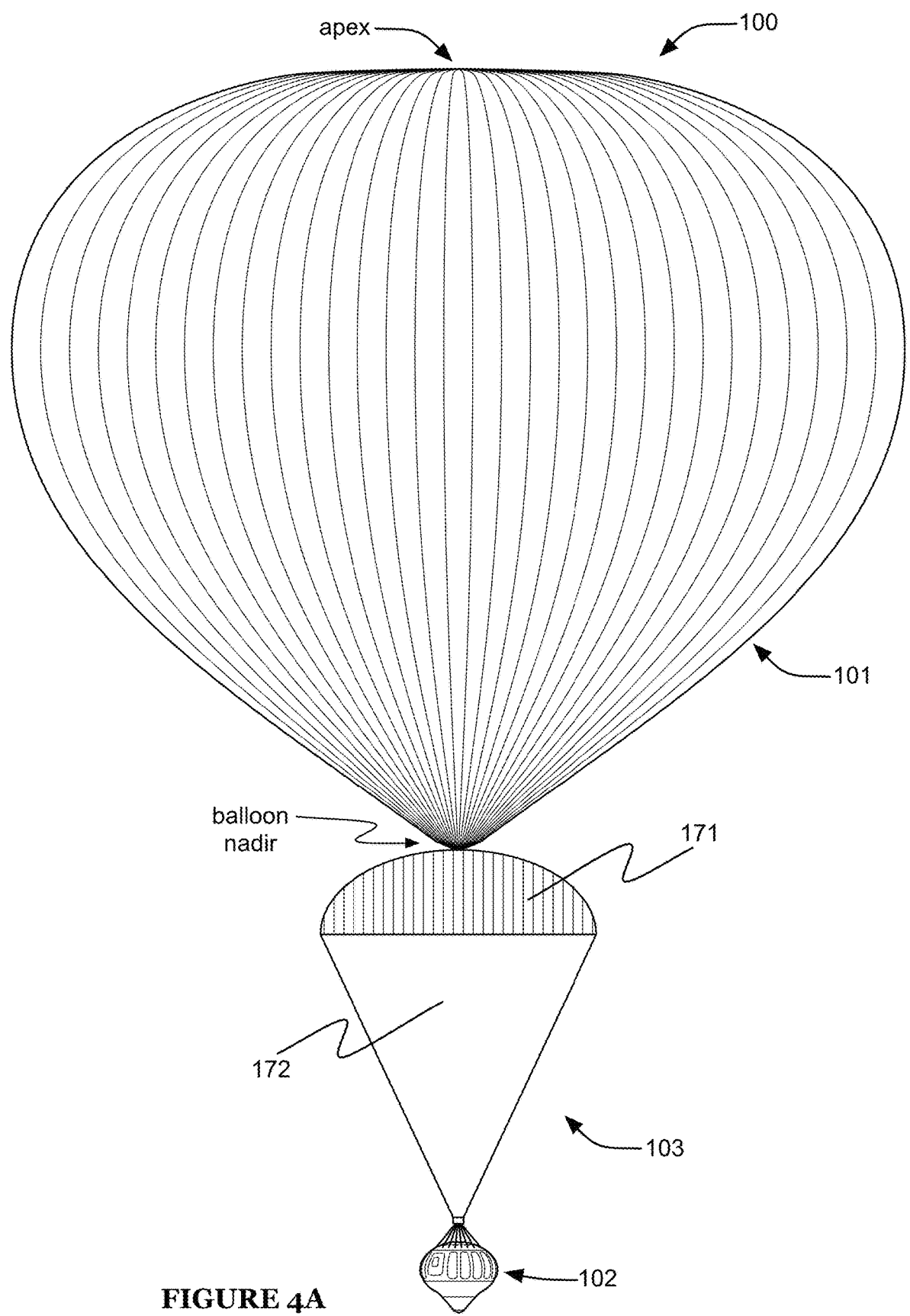
FIGS. 4A-4C are side views of an example of the balloon system in a fully-inflated state, a partially-inflated state, and a balloon-detached state, respectively, with the parachute in a deployed configuration.
Figure 4B:
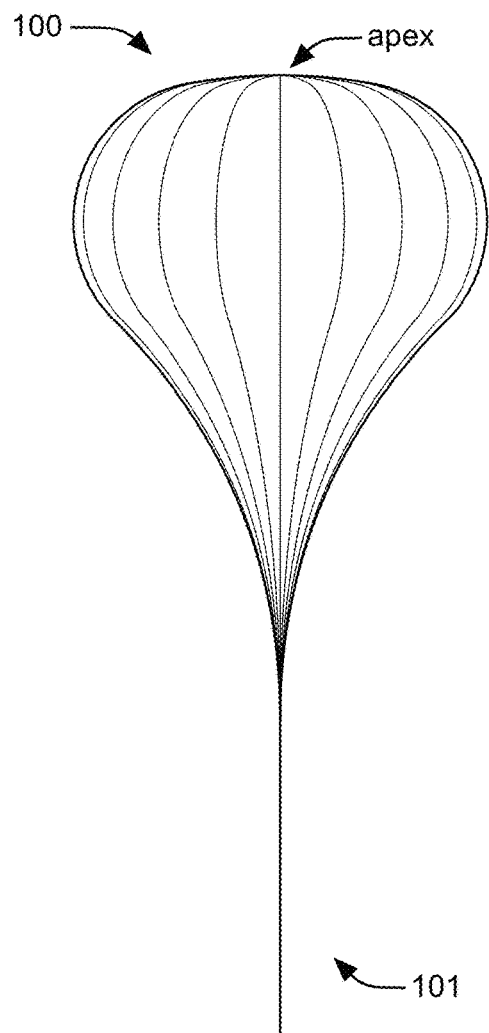
Figure 4B:
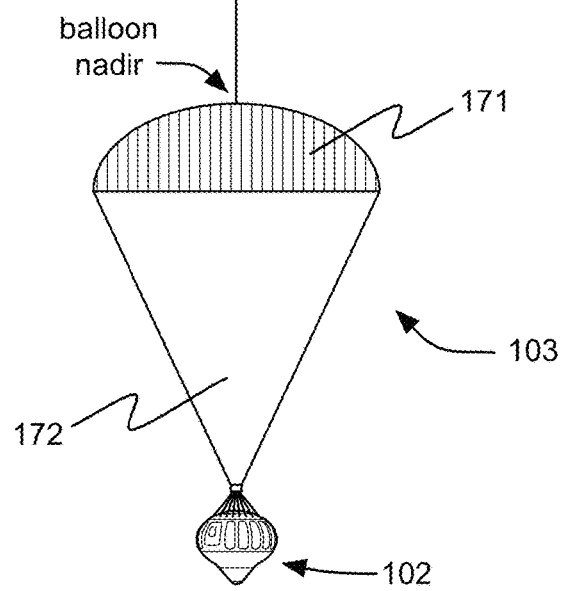
Figure 4C:
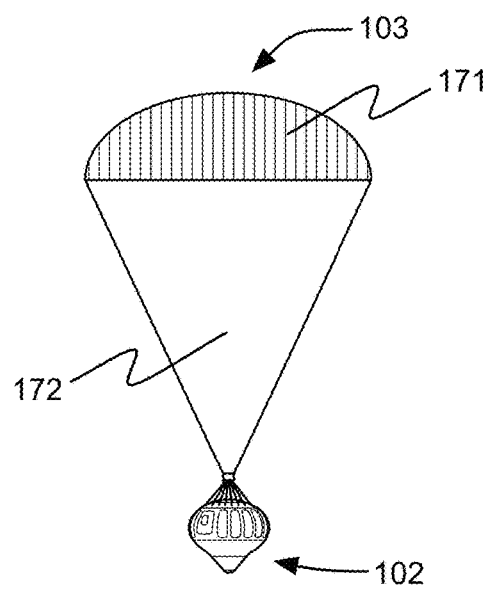

In the deployed configuration, the canopy is preferably open (e.g., held open by air moving past the balloon system during its descent), such as shown by way of examples in FIGS. 4A-4C and/or 6B. In this configuration, the payload is preferably suspended from the canopy by the suspension lines (e.g., wherein some or all of the suspension lines are held taut between the payload and canopy). In this configuration, the payload can optionally be separately suspended from the balloon (but can alternatively not be suspended from the balloon, such as in embodiments in which the balloon has been released from the payload). In this configuration, the balloon can remain tethered to the payload, keeping the tether under tension, or can be separated from the payload and parachute, in which case, the tether may not be under tension (e.g., above the point at which the suspension lines connect to the tether, in embodiments in which they do so). In a specific example, the tether is connected to the canopy (e.g., at or near the canopy apex, around the canopy vent, etc.), and in the deployed configuration, the tether pulls down on the canopy, thereby helping define the canopy shape. In this specific example, the canopy can have a pull-down apex shape, an annular shape (e.g., toroidal shape), and/or any other suitable shape.

In some examples, the canopy apex remains at substantially the same height (e.g., with respect to the tether, the end of the suspension lines, and/or the payload, etc.) in both the stowed and deployed configurations (e.g., wherein temporary fasteners hold the apex at this height while in the stowed configuration). Alternatively, the canopy apex may increase or decrease in height (e.g., with respect to the tether, the end of the suspension lines, and/or the payload, etc.) between the stowed and deployed configurations.

However, the parachute can additionally or alternatively have any other suitable arrangement in the stowed and/or deployed configurations. In some embodiments, the parachute can additionally or alternatively be configurable in a reefed configuration and/or in any other suitable configurations.

Figure 6A:
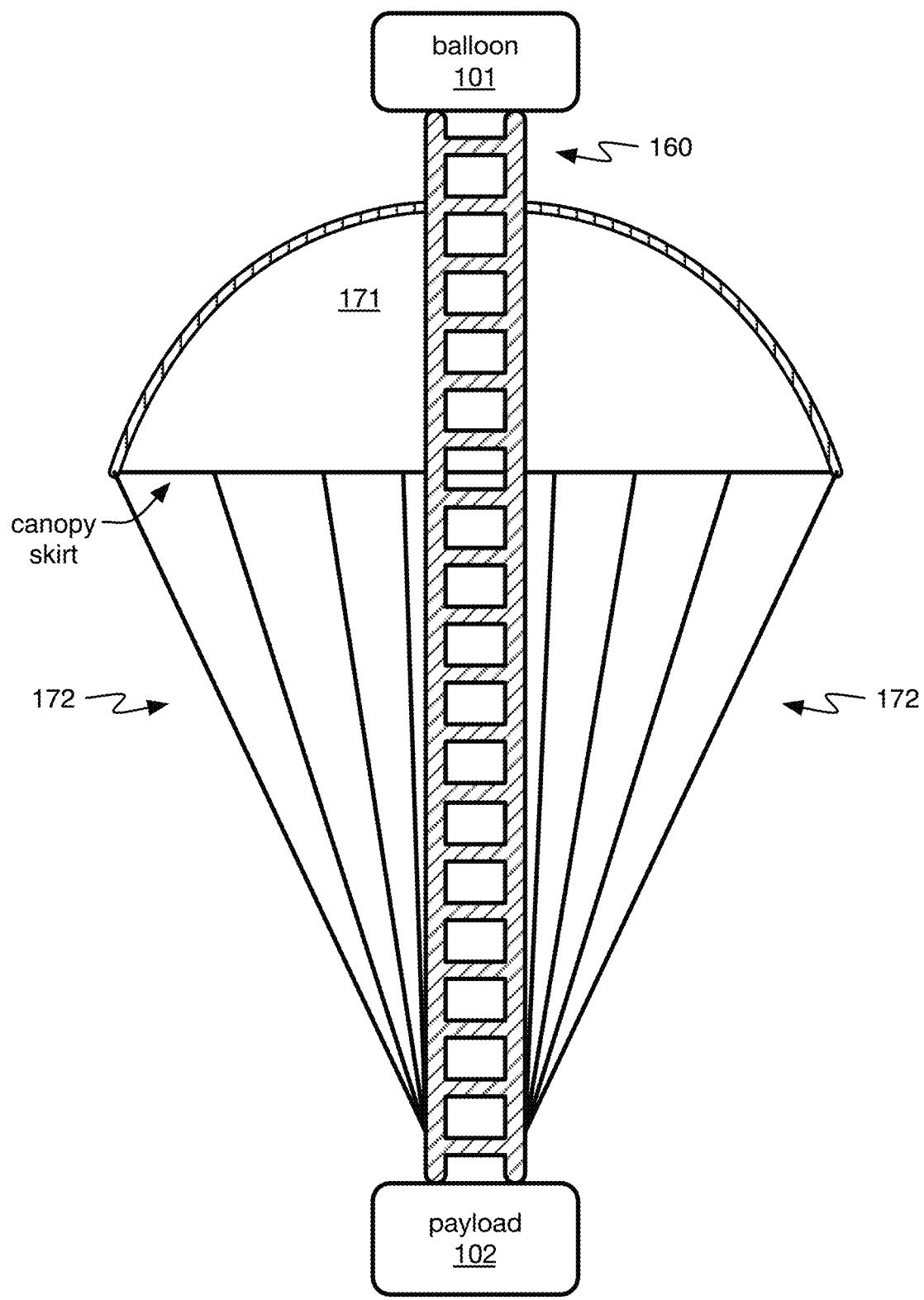
FIGS. 6A-6B are cross-sectional side views of a first and second example, respectively, of the safety module in the deployed configuration.
Figure 6B:
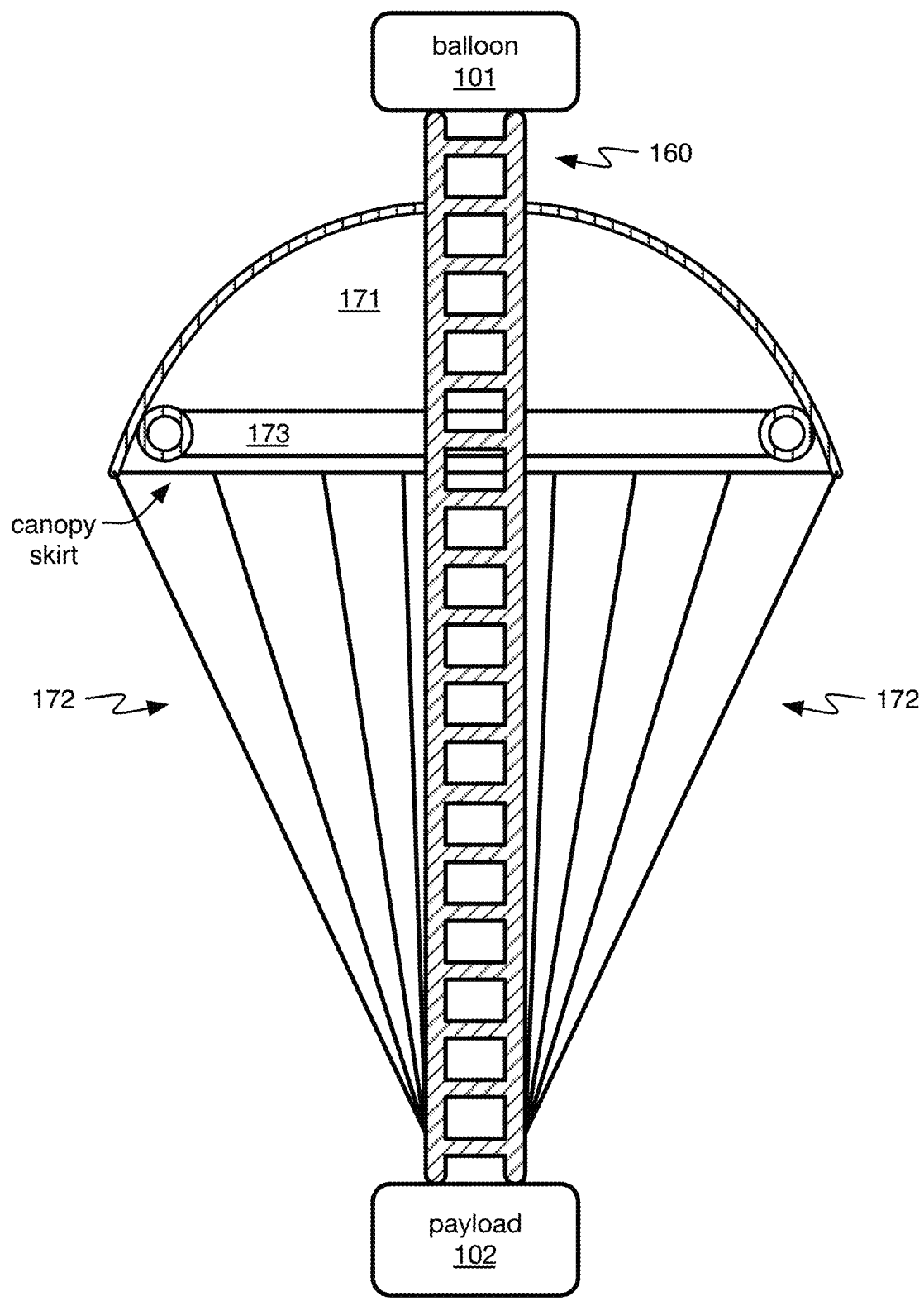

The parachute can optionally include one or more deployment mechanisms 173, which can function to assist the transition from the stowed configuration to the deployed configuration (e.g., assist in canopy opening). In one example, the deployment mechanism includes a flexible tube attached to and/or defined in the canopy (e.g., attached and/or defined around some or all of the canopy skirt). For example, the deployment mechanism can define an annular structure arranged along (e.g., encircling or encircled by) the canopy skirt (e.g., as shown in FIG. 6B). The tube can be of the same material as the canopy or a different material. In this example, the flexible tube can be operable to be filled (e.g., inflated) during parachute deployment, thereby causing the canopy to open (partially or fully). This opening can allow the canopy to catch air as the balloon system descends, thereby further opening the canopy and/or maintaining the canopy in an open state. After the canopy opens, this tube can remain filled or can be allowed to empty (e.g., deflate). However, the parachute can additionally or alternatively include any other suitable deployment mechanisms (or can include no such mechanisms).

However, the parachute can additionally or alternatively include any other suitable elements in any suitable arrangement.

3.3.3 Cover.

The safety module can optionally include a cover 180, which can function to cover the parachute 170 while in the stowed configuration (e.g., preventing the parachute's transition to a deployed configuration, preventing tangling of the parachute, protecting the parachute from damage, etc.). The cover 180 preferably defines a cover (e.g., sleeve) that encircles (e.g., tightly encircles) the parachute or a portion thereof. In embodiments in which the canopy encircles the tether when stowed, the cover preferably also encircles some or all of the tether, such as tether portions around which the parachute is arranged; in embodiments in which the stowed canopy does not encircle the tether (e.g., is arranged alongside the tether), the cover may encircle the parachute and the tether (e.g., holding the parachute against the tether), may encircle only the canopy, or may encircle any other suitable elements of the system. The cover is preferably wrapped around the parachute (e.g., around the tether long axis), and can be retained in this wrapped configuration by one or more binding elements 181 (e.g., as shown in FIGS. 3A-3B). The binding elements can include zippers, latches, and/or any other suitable fasteners. The binding elements are preferably operable to be released, thereby allowing the cover to unwrap from the parachute (e.g., thus enabling and/or initiating parachute opening). In alternate embodiments, the cover 180 may not cover the parachute, but can otherwise prevent the parachute from deploying, such as by binding some or all of it in the stowed configuration (for example, the cover may include one or more straps or lines that encircle the parachute).

The cover is preferably operable to be pulled off of the parachute (e.g., pulled along the length of the parachute, such as along tether long axis, preferably upward along the axis). For example, the cover can be connected by one or more removal elements 182 to one or more releasable elements of the balloon system (e.g., as shown in FIGS. 3A-3B). The removal element 182 can be a line, a rigid connection, and/or any other suitable element. In examples, the releasable element can be the balloon 101, the drogue 190, and/or any other suitable element operable to be released from the payload, the tether, and/or other elements of the balloon system. When the releasable element is released from the payload, it separates (e.g., from the tether), pulling off the cover by the removal element. To facilitate this removal mode, the cover is preferably open on both ends, but can alternatively be open on only one end or on neither end. One opening (e.g., at the bottom of the cover) can allow the parachute to exit the cover as it is pulled (e.g., by the removal element), and the opposing opening (e.g., at or near the top of the cover) can allow air ingress while the cover is being pulled off, to fill the volume evacuated by the parachute. In alternate embodiments, the cover may include apertures, slits, perforations, and/or other openings along all or part of its length, which can analogously allow air ingress.

However, the cover 180 can additionally or alternatively include any other suitable elements in any suitable arrangement.

3.3.4 Drogue.

The safety module can optionally include a drogue 190, which can function as a balloon system stabilizer, as a pilot chute for deployment of the parachute 170, and/or can have any other suitable functions.

In a first embodiment, the drogue is integrated into the tether. For example, the drogue can form a portion of the tether, preferably an upper portion (e.g., above the location at which the tether is encircled by the canopy 171). While the payload is suspended from the balloon, the drogue is held under tension (along with the rest of the tether). In examples, the drogue can be deployed by removing tension from the drogue (e.g., by releasing the balloon from the tether). The removal of tension can allow the drogue to open. In one example (e.g., as shown in FIG. 3B), the safety module includes a releasable connection between the drogue and the tether below it, and the drogue is connected to the cover 180 (e.g., by a removal element 182). In this example, when the releasable connection to the drogue is released, the drogue separates from the tether, pulling the cover with it off the parachute 170. This preferably causes and/or enables the parachute's transition to the deployed configuration. However, the drogue can additionally or alternatively include one or more drogue covers (e.g., analogous to the cover 180 described above) and/or drogue deployment mechanisms (e.g., which can be operable to initiate drogue deployment, such as after the drogue tension is released, preferably preventing drogue deployment until actuated) and/or can be operable to deploy in any other suitable manner.

In a second embodiment, the drogue can be attached to the parachute 170 and/or cover 180 and not to the tether 160. In this embodiment, the drogue is preferably operable to be deployed, such as by releasing the drogue from a drogue cover (e.g., analogous to the cover 180 described above) and/or by activating a drogue deployment mechanism. When deployed, the drogue can open, and can optionally (e.g., in embodiments in which the safety module includes a cover 180) function to pull the cover off the parachute. In some examples, the drogue can pull the cover off the parachute immediately after opening, whereas in other examples, the drogue pulls the cover off the parachute in response to being controlled to do so, such as by being released from the parachute.

However, the drogue 190 can additionally or alternatively include any other suitable elements in any suitable arrangement.

The safety module can additionally or alternatively include any other suitable elements (e.g., as described in U.S. Provisional Patent Application 62/969,447, filed Feb. 3, 2020 and titled "Space Capsule", which is herein incorporated in its entirety by this reference, such as described regarding the 'Backup Descent System').

Further, the safety module can optionally include one or more additional safety elements, such as auxiliary propulsion systems (e.g., propellers, jet engines, rockets such as retrorockets, etc.), flight control surfaces (e.g., surfaces, such as fixed and/or rotary wings, rudders, ailerons, and/or elevators, configured to control vehicle flight, such as powered or unpowered descent, in operation as an aerodyne), and/or any other suitable elements. Such additional safety elements can function to slow descent of the system (e.g., in circumstances in which the balloon and/or parachute are not able to sufficiently slow system descent on their own, in circumstances in which the balloon and/or parachute fail, etc.), can function to reposition the system (e.g., redirect capsule trajectory to ensure a water landing rather than a terrestrial landing), and/or can function to provide safety (e.g., backup safety) for the system in any other suitable manner.

However, the balloon system 100 can additionally or alternatively include any other suitable elements in any suitable arrangement.

4. Method.

The method 200 for balloon system operation is preferably performed using the balloon system 100 described above. However, the method 200 can additionally or alternatively be performed using any other suitable systems.

4.1 Operating the Balloon System Inflight.

The method preferably includes operating the balloon system in flight S210. During performance of S210, the balloon is preferably inflated with a lighter-than-air fluid (e.g., lift gas, such as hydrogen, helium, etc.). The balloon can be partially inflated, fully or substantially fully inflated, and/or have any other suitable inflation state. S210 can include one or more of: taking off, ascending, maintaining altitude, maneuvering, descending, and/or any other suitable flight activities.

Throughout S210, the parachute is preferably in the stowed configuration (e.g., contained within a cover), such as described above in more detail regarding the parachute 170. However, the balloon system can be otherwise configured.

4.2 Descending Under the Parachute.

The method preferably includes descending under the parachute S220. Descending under the parachute S220 can function to slow the rate of descent of the balloon system. S220 is preferably performed after S210 (e.g., immediately following S210), and is preferably performed while the balloon system is descending, but can additionally or alternatively be performed with any other suitable timing.

S220 preferably includes deploying the parachute S221 (e.g., transitioning the parachute from a stowed configuration to a deployed configuration, such as described above regarding the parachute 170).

Figure 8A:
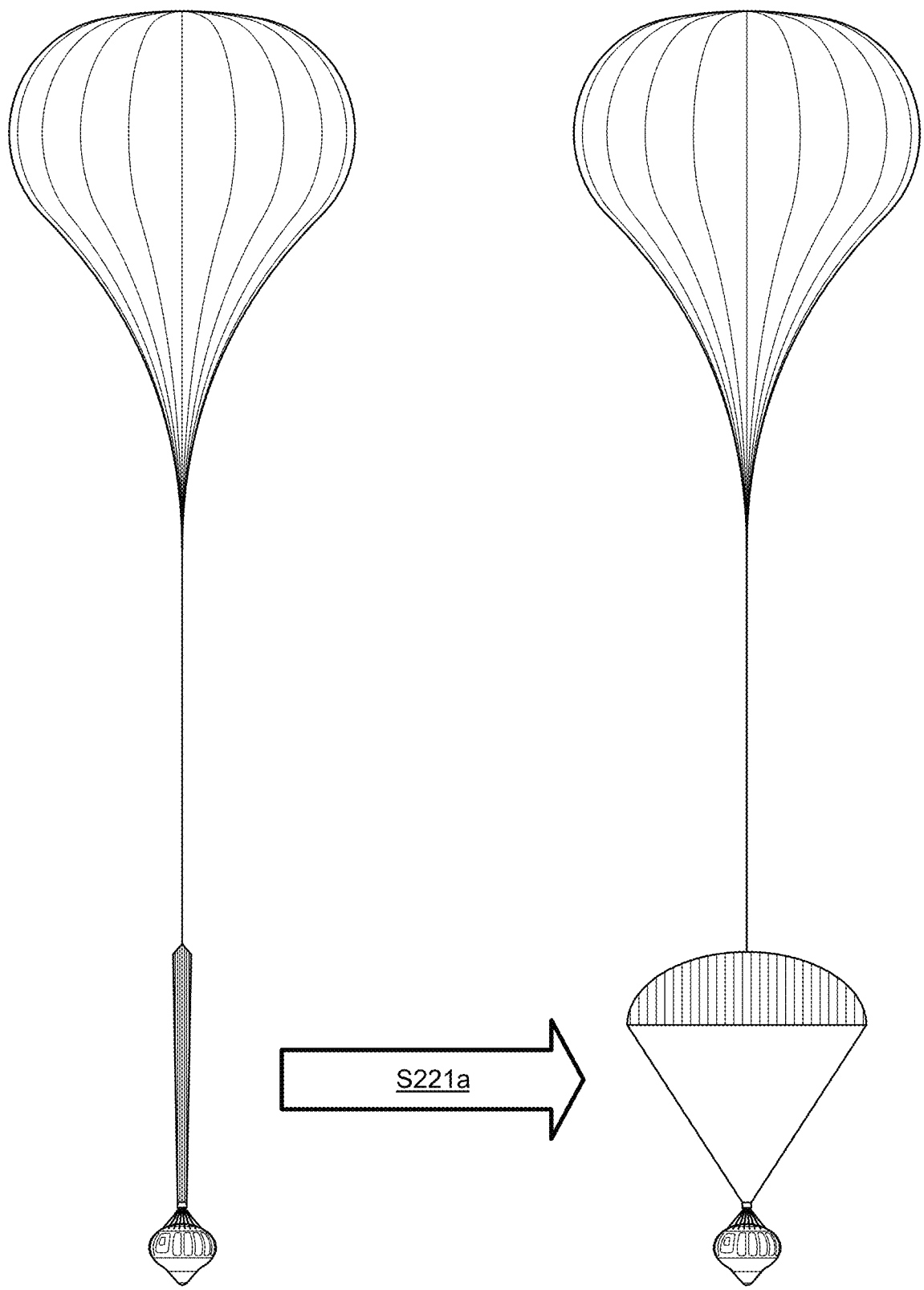
FIGS. 8A-8B are schematic representations of a first and second example, respectively, of deploying the parachute.

In embodiments in which the balloon system includes a parachute cover (e.g., as described above in more detail regarding the cover 180), S221 preferably includes removing the cover. In a first embodiment, removing the cover includes unwrapping the cover S221a (e.g., as shown in FIG. 8A). This embodiment is preferably employed when deploying the parachute for use in tandem with the balloon (e.g., use while the payload is suspended from the balloon). Unwrapping the cover preferably includes releasing some or all of the binding elements, which can cause the cover to unwrap from the parachute (and/or otherwise separate from the parachute), such as due to air moving past the cover during the balloon system's descent. In this embodiment, the balloon preferably remains attached to the payload. However, S220 can alternatively include releasing the balloon after or concurrent with unwrapping the cover S221a (e.g., wherein the balloon is released after successful deployment of the parachute, such as in response to successful deployment and/or in response to any other suitable criteria).

Figure 8B:
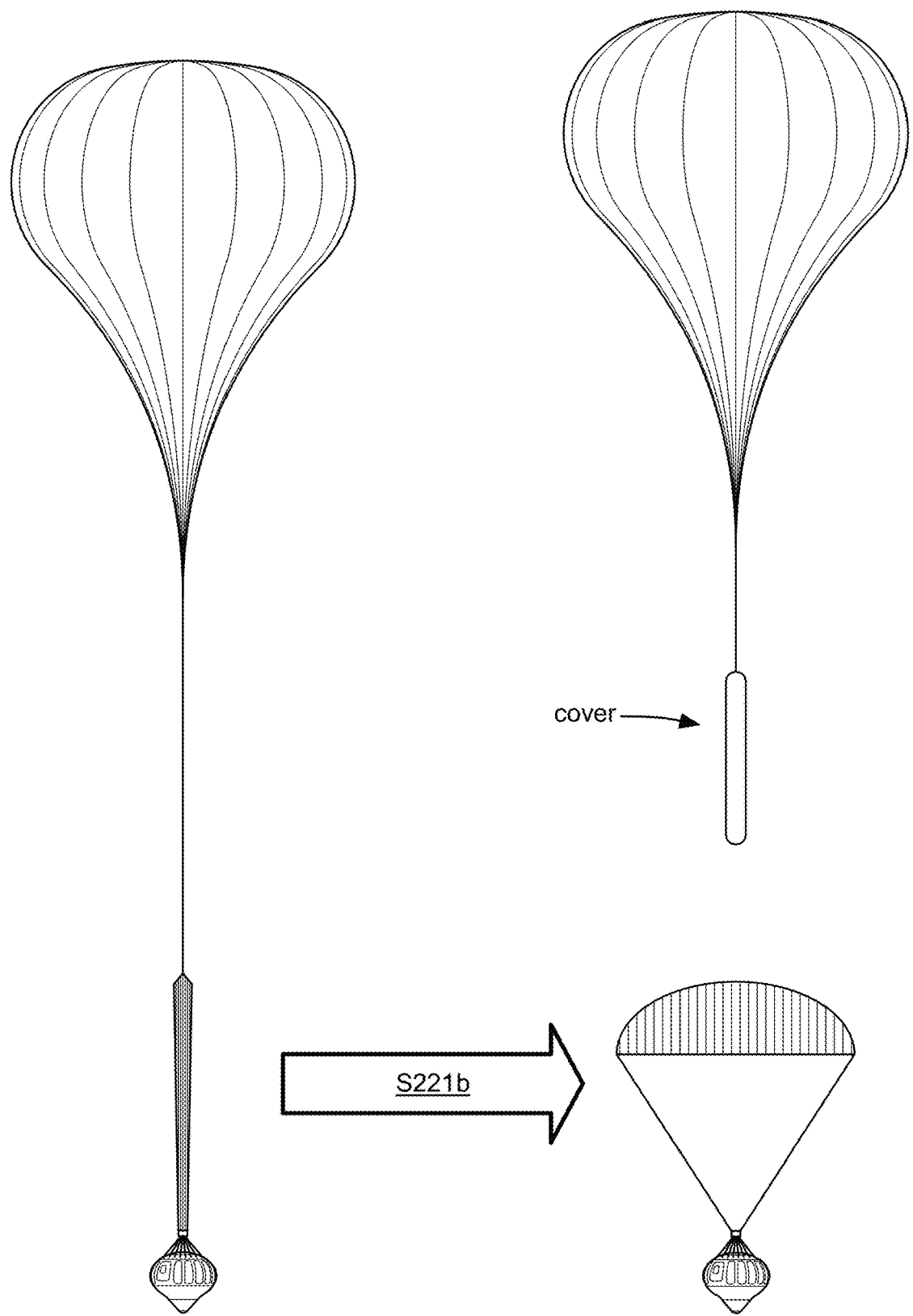

In a second embodiment, removing the cover includes pulling off the cover S221b (e.g., as shown in FIG. 8B). This embodiment is preferably employed when deploying the parachute for use without the balloon (e.g., use after the balloon is released from the payload). In this embodiment, the cover is preferably attached by a removal element to a releasable element (e.g., balloon, drogue, etc.). This embodiment preferably includes releasing the releasable element (e.g., disconnecting it from the payload and/or tether), causing it to pull the cover off the parachute as it separates. In examples of this embodiment in which the releasable element is a drogue, removing the cover can include first releasing the balloon, which can cause the drogue to open, and then releasing the drogue, which can cause it to pull off the cover (e.g., as described above in more detail regarding the drogue 190).

However S221 can additionally or alternatively include removing the cover in any other suitable manner, and/or may not include removing the cover (e.g., in embodiments in which the balloon system does not include a parachute cover).

S221 can optionally include activating one or more deployment mechanisms. In embodiments in which the parachute includes one or more deployment mechanisms, these mechanisms are preferably activated in order to initiate and/or assist parachute deployment (e.g., canopy opening). The deployment mechanisms are preferably activated after removing the cover, but can additionally or alternatively be activated before removing the cover, concurrent with removing the cover, and/or with any other suitable timing. In one example, activating the deployment mechanism includes inflating the mechanism (e.g., by releasing compressed gas into it), thereby causing the canopy to open, such as described above in more detail regarding the deployment mechanism 173. However, S221 can additionally or alternatively include activating any other suitable deployment mechanisms in any other suitable manner. Further, S221 can additionally or alternatively include deploying the parachute in any other suitable manner.

S220 preferably includes descending under the deployed parachute (e.g., wherein the payload is suspended from the parachute canopy and the parachute slows the descent of the payload). The balloon system preferably descends under the parachute until landing, but can alternatively descend for any other suitable period of time (e.g., after which the parachute may be released, reefed, stowed, and/or otherwise altered).

In some embodiments, S220 can include steering during descent (e.g., using a steerable parachute or parasail, using auxiliary flight control surfaces and/or auxiliary propulsion mechanisms, etc.). Although described herein as 'descent', a person of skill in the art will recognize that S220 can additionally or alternatively include ascending, maintaining altitude, and/or otherwise operating the balloon system while suspended from the parachute (e.g., by controlling the steerable parachute or parasail, etc.).

S220 can optionally include one or more elements such as described in U.S. Provisional Patent Application 62/969,447, filed Feb. 3, 2020 and titled "Space Capsule", which is herein incorporated in its entirety by this reference (e.g., as described in U.S. Provisional Patent Application 62/969,447 regarding the 'Backup Descent System').

However, S220 can additionally or alternatively include descending under the parachute in any other suitable manner.

4.3 Additional Balloon Operations.

The method 200 can optionally include one or more elements such as described in U.S. Provisional Patent Application 62/969,447, filed Feb. 3, 2020 and titled "Space Capsule", in U.S. patent application Ser. No. 17/160,837, filed 28 Jan. 2021 and titled "Aerospace Vehicle System and Method of Operation", in U.S. patent application Ser. No. 17/162,151, filed Jan. 29, 2021 and titled "Aerospace Balloon System and Method of Operation", and/or in U.S. patent application Ser. No. 17/164,668, filed Feb. 1, 2021 and titled "Aerospace Balloon System and Method of Operation", each of which is herein incorporated in its entirety by this reference. For example, the method can include one or more elements described in U.S. patent application Ser. No. 17/160,837, U.S. patent application Ser. No. 17/162,151, and/or U.S. patent application Ser. No. 17/164,668 regarding the methods described therein, and/or one or more elements described in U.S. Provisional Patent Application 62/969,447 regarding balloon system operation (e.g., as described regarding 'Launch and Recovery' and/or 'Buoyancy control'). However, the method 200 can additionally or alternatively include performing any other suitable balloon system flight operations, and/or can include any other suitable elements performed in any suitable manner.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

I claim:

1. A balloon system comprising:
a balloon;
a payload;
a tether mechanically connecting the payload to the balloon; and
a parachute module arranged between the payload and the balloon, the parachute module comprising:
a canopy; and
a set of suspension lines mechanically connecting the payload to the canopy;
wherein:
the balloon system is operable in a first configuration in which:
the balloon contains a lighter-than-air fluid;
the payload is suspended from the balloon by the tether; and
the parachute module is in a stowed configuration; and
the balloon system is operable to transition from the first configuration to a second configuration in which:
the balloon contains the lighter-than-air fluid;
the payload is suspended from the balloon by the tether;
the parachute module is in a deployed configuration in which the canopy is substantially open and in which the canopy encircles the tether; and
the payload is suspended from the canopy by the set of suspension lines.

2. The system of claim 1, wherein, in the second configuration:
the parachute module is arranged between the payload and the balloon; and
the canopy is not suspended from the balloon.

3. The system of claim 1, wherein the parachute module extends substantially along the tether.

4. The system of claim 1, wherein, in the first configuration, the suspension lines of the set are substantially slack.

5. The system of claim 1, wherein the tether comprises a ladder configured to resist torsion.

6. The system of claim 1, wherein the tether is mechanically connected to at least one of the balloon or the payload via a rotary coupling.

7. The system of claim 1, wherein the balloon system is further operable to transition from the first configuration to a third configuration in which:
the payload is not mechanically coupled to the balloon;
the parachute module is in the deployed configuration; and
the payload is suspended from the canopy by the set of suspension lines.

8. The system of claim 1, wherein:
the parachute module further comprises a sleeve; and
in the first configuration, the canopy is substantially contained within the sleeve.

9. The system of claim 8, further comprising a drogue comprising a drogue canopy and a set of drogue lines, wherein:
the tether is mechanically connected to the balloon via the drogue; and
the set of drogue lines is mechanically connected to the sleeve.

10. The system of claim 8, wherein:
in the first configuration, the sleeve is wrapped around the tether and the parachute module, substantially about a long axis of the tether directed from the balloon to the payload; and
transitioning from the first configuration to the second configuration comprises controlling the sleeve to unwrap.

11. The system of claim 1, wherein the tether extends through and is captive within the canopy.

12. The system of claim 11, wherein the canopy defines a vent, wherein the tether extends through and is captive within the vent.

13. The system of claim 12, wherein the parachute module is a toroidal parachute module.

14. A balloon system comprising:
a balloon containing a lighter-than-air fluid;
a tether mechanically connected to the balloon;
a payload suspended from the balloon by the tether; and
a parachute module arranged between the payload and the balloon, the parachute module comprising:
a canopy encircling the tether; and
a set of suspension lines mechanically connecting the payload to the canopy;
wherein:
the parachute module extends substantially along the tether; and
the payload is not suspended from the balloon by the parachute module.

15. The system of claim 14, wherein the tether defines a long axis between the balloon and the payload, wherein the tether is configured to resist torsion about the long axis.

16. The system of claim 14, wherein:
the parachute module further comprises a sleeve; and
in the first configuration, the canopy is substantially contained within the sleeve.

17. The system of claim 14, further comprising a drogue comprising a drogue canopy and a set of drogue lines, wherein:
the tether is mechanically connected to the balloon via the drogue; and the set of drogue lines is mechanically connected to the parachute module.

18. The system of claim 14, wherein the canopy defines a vent, wherein the tether extends through and is captive within the vent.

19. The system of claim 18, wherein the parachute module is a pull-down apex parachute module.

20. The system of claim 14, wherein the parachute module is operable to transition to a deployed configuration in which:

the canopy is substantially open; and
the payload is suspended from the canopy by the set of suspension lines.

21. The system of claim 20, wherein, while the parachute module is in the deployed configuration, the payload is suspended from the balloon by the tether and not by the parachute module.

* * * * *